United States Patent [19]
Barlow et al.

[11] Patent Number: 5,654,793
[45] Date of Patent: Aug. 5, 1997

[54] METHOD AND APPARATUS FOR HIGH RESOLUTION MEASUREMENT OF VERY LOW LEVELS OF POLARIZATION MODE DISPERSION (PMD) IN SINGLE MODE OPTICAL FIBERS AND FOR CALIBRATION OF PMD MEASURING INSTRUMENTS

[76] Inventors: Arthur John Barlow, 44 Lymington Bottom Four Marks, Alton Hants, United Kingdom, GU34 5AH; Timothy George Arnold, 34 Stockdale 5 Road Eton Wilk, Windsor Berks, United Kingdom, 524 62B; Terry L. Voots, 6541 Willowbottom Dr., Hichory, N.C. 28602; Peter James Clark, Hamlet, Saunders Lane, Aubridge, Romsey Hants, United Kingdom, 5051 068

[21] Appl. No.: 445,320

[22] Filed: May 19, 1995

[51] Int. Cl.$^6$ .............................. G01J 4/04; G01N 21/23
[52] U.S. Cl. ............................. 356/73.1; 356/365
[58] Field of Search .................. 356/73.1, 364, 356/365, 243

[56] References Cited

U.S. PATENT DOCUMENTS 3,445,833  5/1969  Lins ..................... 356/368 X
4,241,997  12/1980  Chraplyvy ............... 356/243 X
4,750,833  6/1988  Jones ................... 356/73.1

OTHER PUBLICATIONS

Costa et al. "Phase Shift Technique for the Measurement of Chromatic Dispersion in Optical Fibers Using LED'S" IEEE Journal of Quantum Electronics, vol. QE–18, No. 10, Oct. 1982, pp. 1509–1515.

*Primary Examiner*—Vincent P. McGraw
*Attorney, Agent, or Firm*—Lappin & Kusmer LLP

[57] ABSTRACT

A method and apparatus for measuring Polarization Mode Dispersion (PMD) of a single mode optic fiber by providing a PMD measuring instrument with a light source. Light is transmitted serially through the optic fiber being tested and an artefact with a known, stable PMD value. The artefact biases the total PMD measured by the instrument away from zero. The PMD of the optic fiber may then be determined by data reduction of the total measured PMD. The method may also be used to calibrate a PMD instrument.

14 Claims, 2 Drawing Sheets

METHOD AND APPARATUS FOR HIGH RESOLUTION MEASUREMENT OF VERY LOW LEVELS OF POLARIZATION MODE DISPERSION (PMD) IN SINGLE MODE OPTICAL FIBERS AND FOR CALIBRATION OF PMD MEASURING INSTRUMENTS

BACKGROUND OF THE INVENTION

The present invention relates to means for testing transmissive optical fibers, and more particularly to the high resolution measurement of Polarization Mode Dispersion (PMD) values in single mode optical fibers.

Single mode optical fibers are used to transmit large quantities of information over significant distances. In order to preserve the integrity of such transmissions, it is desirable to eliminate distortion. It is impossible, however, to remove all forms of distortion from transmissive media. Therefore, it is necessary to measure the distortion, either to determine the suitability of a transmissive medium maximum information capacity, or to determine the most satisfactory manner of handling the distortion. For a fiber optic communications system, the most significant specification for determining the information carrying capacity of the system is the bit-error rate. The bit-error rate is increased by, among other factors, the pulse broadening caused by dispersion in a fiber. Use of a single mode fiber eliminates modal dispersion, but not chromatic dispersion or polarization mode dispersion (PMD). PMD is a bandwidth limiting effect that is present to some degree in all single mode fibers that are suitable for optical transmissions. It is, therefore, a potential source of signal distortion in optical communications systems.

Current methods exist for measuring dispersion in optical fibers, for example, the system of U.S. Pat. No. 4,750,833 issued Jun. 14, 1988 to Roger S. Jones. Jones describes a method and apparatus for measuring transmissive dispersion, such as chromatic or polarization dispersion. A light source modulated at a first frequency is synchronously varied at a lower frequency back and forth to and from a first and a second value of a transmissive parameter, e.g. source wavelength or polarization state. Relative phases of the first modulation signal and the light transmitted through the fiber under test are measured by a phase detector. A lock-in amplifier compares the phase detector output to the lower frequency signal to provide a direct current output indicative of dispersion. This method and apparatus proved to be superior in resolution than a system measuring time differences. However, with progress in the art, a method and apparatus for measuring PMD with a resolution at least an order of magnitude higher than achievable with a relative phase or time measurement system are highly desirable. Indeed, the present invention contemplates measurement of PMD with approximately two orders of magnitude better resolution than that afforded by the above-described relative phase method.

Other current methods of measuring polarization mode dispersion in optical fibers, include Interferometry, Jones Matrix Eigenanalysis, the Wavelength Scanning (WS) cycle counting method, and the WS Fourier method. Interferometry uses the time domain to employ a low-coherence light source and a Michelson or Mach-Zehnder Interferometer to observe output in the form of the autocorrelation function of the time distribution, and the PMD of the fiber may be obtained from this data. Interferometry is limited at the low end by the coherence time, typically 0.15 ps, of the broadband source used.

Jones Matrix Eigenanalysis uses a polarimetric determination of the instantaneous polarization transmission behavior, in the form of a Jones matrix with two eigenstates called Principal States of Polarization (PSP). By measuring the wavelength variation of the Jones matrix and hence the PSPs, the differential delay between PSPs may be determined. This delay is averaged over a specific wavelength scan to establish the fiber PMD value. Jones Matrix Eigenanalysis is limited by polarimetric accuracy and resolution to 0.01 ps.

The WS cycle counting and the WS Fourier methods both use a light power transmission through the fiber using a linearly polarized source and a polarization analyzer before the light detector. The fiber gives rise to an oscillation pattern whose oscillation frequency is related to PMD. In the WS cycle counting method, the number of complete oscillations in a given wavelength interval is counted to determine PMD. The WS cycle counting method is limited to a minimum of three cycles in the wavelength scan, typically 0.09 ps. In the WS Fourier method, however, wavelength scanning PMD is determined by a frequency analysis technique on the oscillation pattern based on a Fourier transform. The Fourier method is limited to a minimum one cycle in the wavelength scan used, typically 0.03 ps.

OBJECTS OF THE INVENTION

It is an object of the present invention to provide a method and apparatus for higher resolution measurement of PMD values below 0.1 ps, useful, e.g. with fibers used for transmission systems operating 5 Gbits/s or above.

It is a more specific object of the present invention to provide a method and apparatus for measuring PMD values between 0.01 ps and 0.1 ps. for use, e.g., with WS Fourier and Interferometry methods.

It is more specifically an object of the present invention to use a birefringent or wavelength specific artefact to bias PMD away from zero, resulting in a broadened PMD peak of the artefact, in order to obtain improved detection and determination of very low PMD levels in optical fibers.

It is a further object of the present invention to determine the PMD of an optical fiber by appropriate data processing of the broadened artefact peak.

It is another object of the present invention to provide a method and apparatus for calibrating wavelength scanning PMD instruments using a birefringent or wavelength selective device.

SUMMARY OF THE INVENTION

Briefly stated, in accordance with the present invention a method and apparatus are employed for improving measurement of PMD. A PMD measuring instrument with a light source is employed to transmit light serially through optic fiber to be tested and an artefact with a stable, known PMD value. The artefact serves to bias the total PMD measured by the instrument away from zero, removing the influence of any spurious (near-zero) PMD response from the measurement. The PMD of the optic fiber may be determined by appropriate data processing of the measured PMD. The artefact may also be used to calibrate a wavelength scanning PMD instrument.

BRIEF DESCRIPTION OF THE DRAWINGS

The means by which the foregoing objects and features of invention are achieved are pointed out with particularity in the claims forming the concluding portion of the specification. The invention, both as to its organization and manner of operation, may be further understood by reference to the following drawings taken in connection with the following description.

Of the drawings.

DESCRIPTION OF THE PREFERRED EMBODIMENTS

Figure 1:
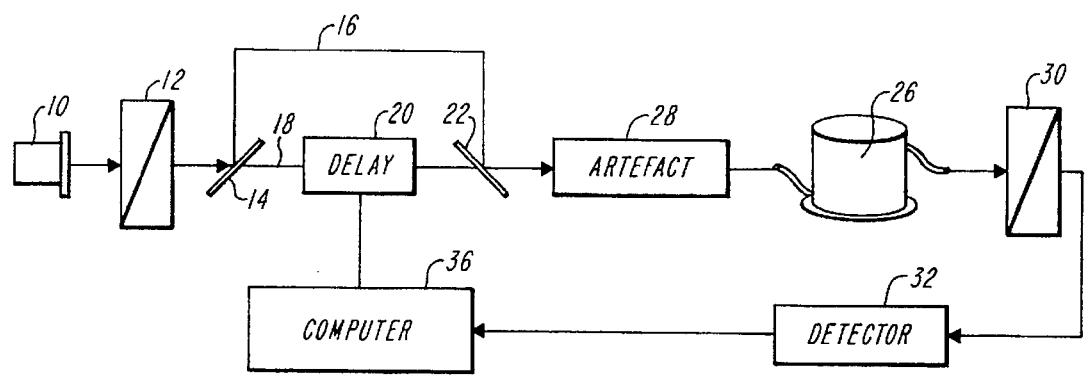
FIG. 1 is a block diagrammatic representation of a system in accordance with the present invention utilizing a Mach-Zender interferometer.
Figure 2:
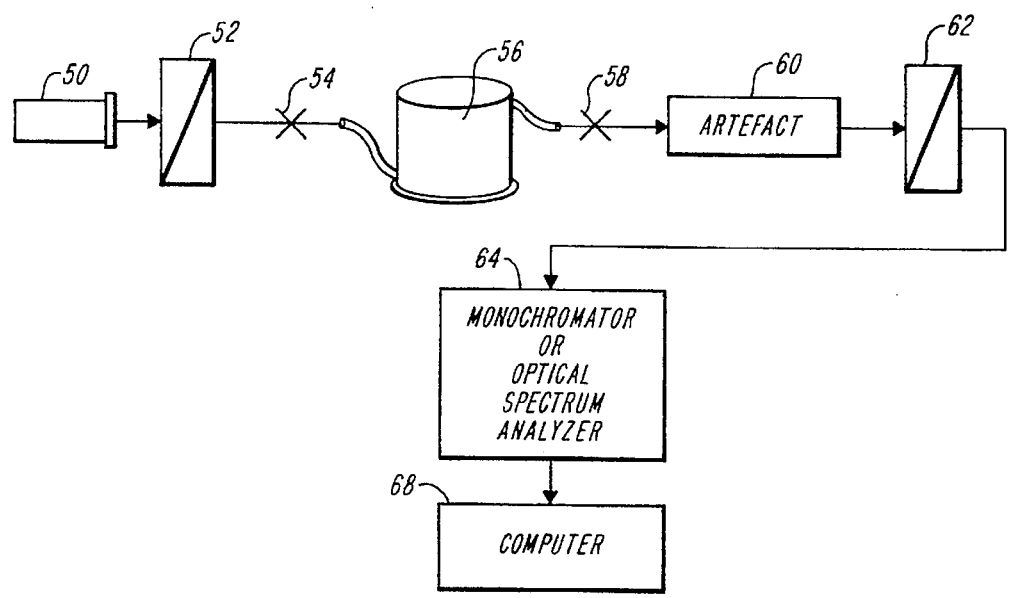
FIG. 2 a block diagrammatic representation of a system in accordance with a further embodiment of the present invention suitable for use with wavelength scanning Fourier analysis (WS Fourier)

Each of FIGS. 1 and 2, which are respective block diagrammatic representations of systems using interferometric measurement or wavelength scanning Fourier analysis (WS Fourier), represent high resolution, polarization dispersion measurement systems, each of which have been incorporated into a system comprising the present invention. "PMD measurement instrument" in this context excludes cycle counting, time pulse methods, relative phase methods or Jones matrix Eigenanalysis. The theory of operation of PMD measurement referred to above is defined in published draft standards of the Telecommunications Industries Association, headquartered in Arlington, Va. These include Fiber Optic Test Procedure (FOTP)-113 *Polarization-Mode Dispersion Measurement for Single-Mode Optical Fibers* by Wavelength Scanning, dated Mar. 20, 1995, and FOTP xxxx, Polarization-Mode Dispersion Measurement for Single-Mode Optical Fibers by Interferometric Method. The detailed operation and procedure of the PMD measurement instrument is described therein and is prior art. Also, particular prior art circuit means are described in the above-cited U.S. Pat. No. 4,740,833 to Jones, which is commonly owned with the present application, and whose disclosure is incorporated herein by reference.

Referring now to FIG. 1, there is illustrated a source 10, comprising a light emitting diode in the present embodiment. A superfluorescent source could also be used. A polarizer 12 polarizes the output of the source 10. A beam splitter 14 divides the polarized light for transmission in first and second paths 16 and 18. The path 18 includes a delay line 20. The delay line 20 can be adjusted to alter the relative optical delay of the first and second paths 16 and 18. This is substantially a Mach-Zehnder interferometer. A beam splitter 22 receives inputs from the paths 18 and 20 and delivers inputs to a fiber under test 26. Inputs may be delivered in known ways such as a lens system delivering light input to the fiber 26, a butt splice to a single mode fiber pigtail or an index-matched coupling. Connected between the beam splitter 22 and fiber 26 is an artefact 28.

The artefact 28 is a device which produces a known, stable polarization mode dispersion. It will assure that the PMD measurement will have a known interference peak level at a particular time value T. In this embodiment, the artefact 28 is a birefringent device, which may be a birefringent waveplate, birefringent fiber or other birefringent device. The time T is the time difference between the fast and slow polarization modes, or simply the PMD of the device.

The output of the fiber 26 is delivered to an analyzer 30 to observe interferences between principal orthogonal states of polarization. All power from the analyzer is coupled to a detector 32. A computer 36 provide electronic signal processing and apparatus control functions. The interference signature versus the setting of the delay line 20 is acquired and stored using the computer 36.

The artefact 28 needs to be in series with the fiber under test, and could be in series with its output instead of its input. This construction could also be incorporated in accordance with these teachings in a Michelson interferometer.

An artefact is coupled with the output of a fiber under test in the embodiment of FIG. 2. In FIG. 2, a source 50 delivers light to a polarizer 52 for coupling through a splice 54 to a fiber under test 56. A splice 58 couples the output of the fiber under test 56 to an artefact 60. An analyzer 62 analyzes the light polarization state, and an optical spectrum analyzer or monochromator 64 allows the polarization transmission versus optical wavelength to be measured. The computer 68 performs Fourier analysis and apparatus control functions, and PMD calculations.

The artefact 60 is a device which produces a known, stable polarization mode dispersion. It will assure that the PMD measurement output will have a known peak level at a particular time value T. In this embodiment, the artefact 60 may be a birefringent device, which may be a birefringent waveplate, birefringent fiber or other birefringent device. The time T is the time difference between the fast and slow polarization modes, or simply the PMD of the device.

Figure 3A:
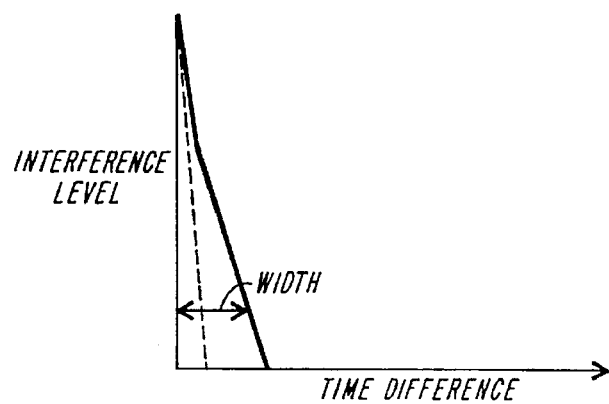
FIGS. 3A and 3B show two graphs demonstrating the operation of the present invention.
Figure 3B:
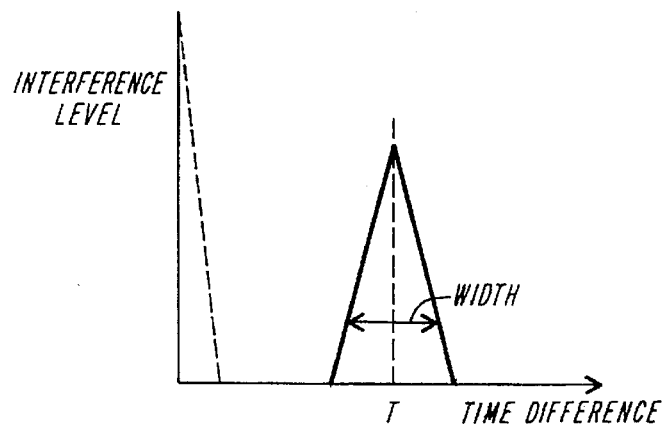
Figure 4:
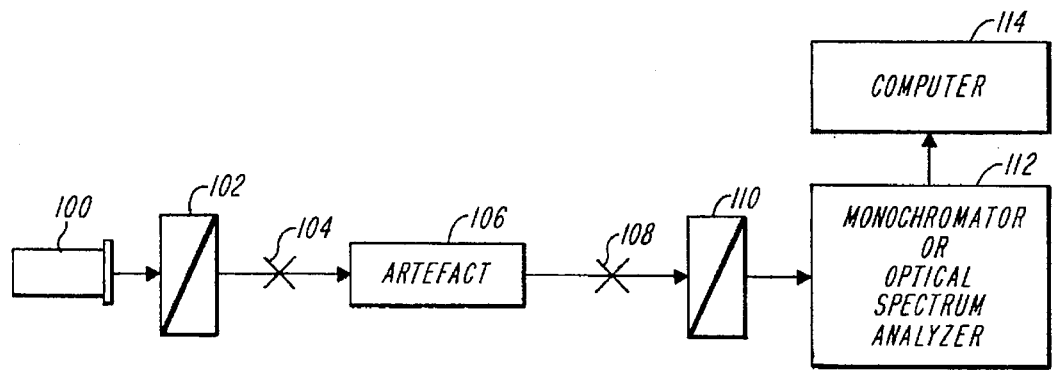
FIG. 4 is a block diagrammatic representation useful in understanding the operation of the present invention for calibration of a PMD instrument.

FIGS. 3a and 3b demonstrate the effect of the present invention in greatly improving the resolution of PMD measurement. In both FIGS. 3a and 3b, the abscissa is time, and the ordinate is PMD value. Spurious responses are illustrated in dotted lines, and measured results are illustrated in solid lines. As PMD values approach zero, there are many effects that can produce a greater error than the value of the PMD. Spurious responses are due to optical losses and other optical imperfections, or source coherence. Such responses provide results that combine with a low level of PMD and distort it. As seen in FIG. 3a, in a system not including the artefact 28 or 60, which is a prior art system, the width, e.g. RMS width, of the signature (solid line) is calculated to determine PMD of the fiber under test. However, the spurious responses have combined with the measured results to distort the PMD value. In FIG. 3b, the basic PMD signature is transposed by the artefact 28 or 60 from zero to time T. The spurious effects do not interact with the measured dispersion. Calculation of the width, e.g. RMS width, of the measured peak, as illustrated in FIG. 3b, the spurious responses do not affect measurement of PMD.

What is claimed new and desired to be secured by Letters Patent of the United States is:

1. A method of making a high resolution measurement of Polarization Mode Dispersion (PMD) of an optic fiber, said method comprising the steps of:

providing a PMD measuring instrument including a light source, transmitting light from said light source serially through the optic fiber and an optical artefact with a stable known PMD value such that total PMD measured by the instrument is temporally biased away from zero PMD, and determining the PMD of the optic fiber from the total measured PMD.

2. The method according to claim 1, wherein the PMD measuring instrument is of the type that utilizes interferometry for making PMD measurements.

3. The method according to claim 2, wherein the artefact is a birefringent device.

4. The method according to claim 3, wherein the birefringent device is a birefringent waveplate or birefringent fiber.

5. The method according to claim 1, wherein the PMD measuring instrument is of the type that utilizes Wavelength Scanning Fourier analysis for making PMD measurements.

6. The method according to claim 5, wherein the artefact is a birefringent device.

7. The method according to claim 6, wherein the birefringent device is a birefringent waveplate or birefringent fiber.

8. An apparatus for making a high resolution wavelength scanning measurement of Polarization Mode Dispersion (PMD) of an optic fiber, said apparatus comprising:

light source means for providing a source of light, an optical artefact with a stable known PMD value for temporally biasing PMD away from zero PMD, means for transmitting the light serially through the optic fiber and the artefact, and means for determining the PMD of the optic fiber as a function of the light serially transmitted through the optic fiber and the artefact.

9. The apparatus according to claim 8, wherein the means for determining PMD utilizes interferometry to measure PMD.

10. The apparatus according to claim 9, wherein the artefact is a birefringent device.

11. The apparatus according to claim 10, wherein the birefringent device is a birefringent waveplate or birefringent fiber.

12. The apparatus according to claim 8, wherein the means for measuring PMD utilizes Wavelength Scanning Fourier analysis to measure PMD.

13. The apparatus according to claim 12, wherein the artefact is a birefringent device.

14. The apparatus according to claim 13, wherein the birefringent device is a birefringent waveplate or birefringent fiber.

* * * * *